United States Patent [19]

Werderitch

[11] 4,145,646
[45] Mar. 20, 1979

[54] START-STOP CIRCUIT FOR SPLIT PHASE MOTOR

[76] Inventor: Frank J. Werderitch, 120 Tamworth Pl., Schaumburg, Ill. 60172

[21] Appl. No.: 834,723

[22] Filed: Sep. 19, 1977

Related U.S. Application Data

[63] Continuation of Ser. No. 567,863, Apr. 14, 1975, abandoned.

[51] Int. Cl.² .............................................. H02P 1/44
[52] U.S. Cl. ..................................... 318/782; 318/786
[58] Field of Search ........... 318/221 R, 221 A, 221 E, 318/221 F, 221 H, 227

[56] References Cited

U.S. PATENT DOCUMENTS

| | | | |
|---|---|---|---|
| 2,017,255 | 10/1935 | Norton | 318/221 F |
| 3,549,970 | 12/1970 | Lewis | 318/221 E |
| 3,662,241 | 5/1972 | Sweger | 318/221 H |
| 3,766,457 | 10/1973 | Fink, Jr. et al. | 318/221 E |
| 3,842,327 | 10/1974 | Wexler | 318/221 E |

Primary Examiner—Gene Z. Rubinson
Attorney, Agent, or Firm—Edmond T. Patnaude

[57] ABSTRACT

A solid state bilateral switching device such as a Quadrac is serially connected with the start winding of a split phase motor and is triggered through a switch which is actuated when the motor approaches normal operating speed.

3 Claims, 6 Drawing Figures

START-STOP CIRCUIT FOR SPLIT PHASE MOTOR

This is a continuation of application Ser. No. 567,863, filed Apr. 14, 1975, now abandoned.

The present invention relates in general to control circuits for split phase ac motors, and it relates more particularly to a novel solid state start-stop circuit for use with such motors.

BACKGROUND OF THE INVENTION

Split phase ac motors are widely used for low power applications as for example in oil burners, furnace blowers, garage door openers and major appliances. Such motors employ separate run and start windings connected in parallel across the ac power source. When the motor is initially energized both windings are energized, and when the rotor speed reaches about eighty-five percent of the normal running speed the start winding is disconnected from the circuit. Various devices are utilized for this latter purpose and include centrifugal switches and current and voltage relays.

A problem which is characteristic of these motors is that they have a relatively short operating life. The principal reason for this is the failure of the switching devices used to cut out the start windings when the rotors approach the normal running speeds. Failure of these switching devices in turn cause the start windings to burn out.

One of the reasons for the failure of these switching devices is the high currents which they are carrying at the time the contacts open. Attempts to increase contact life by use of improved designs and materials have not been altogether successful. Another disadvantage associated with these switching devices is that they are necessarily quite large and occupy a substantial space in the motor housing.

SUMMARY OF THE INVENTION

Briefly, there is provided in accordance with the present invention a solid state start-stop circuit employing a triggered, bilateral semiconductor switch, such as a Quadrac, for cutting off the supply of current to the start winding of a split phase motor when the rotor speed reaches a predetermined value. In accordance with another aspect of the invention, a second triggered, bilateral semiconductor switch is used to deenergize the run winding of the motor when the moror is overloaded and to control the power to the motor in response to a start or stop signal supplied thereto from, for example, a remotely located thermostat or other switch.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
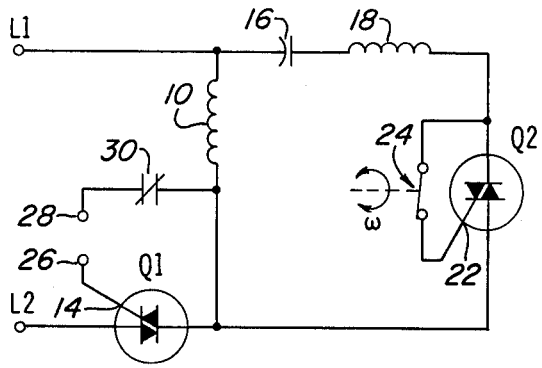
FIG. 1 is a schematic circuit diagram of a capacitor start-induction run motor utilizing the solid state start-stop circuit of the present invention.

Referring now to FIG. 1, a single phase ac power supply is adapted to be connected to a pair of power input terminals L1 and L2. A run winding 10 of a capacitor start induction motor has one terminal connected to the input terminal L1 and its other terminal connected through the power terminals of a triggered bilateral semiconductor switching device Q1 to the input terminal L2. The switching device Q1 is preferably a Quadrac and includes a trigger input terminal 14 which, when energized, permits current to pass between the main power terminals of the device Q1 and thus to the run winding 10. The input terminal L1 is also connected through a capacitor 16 to one terminal of a start winding 18 whose other terminal is connected through the power terminals of a triggered bilateral semiconductor switching device Q2 to the switching device Q1 as shown. The switching device Q2 includes a trigger input terminal 22 which, when energized, permits the device Q2 to pass current between the power terminals thereby energizing the start winding 18. A normally closed centrifugally operated switch 24 is serially connected between the trigger input terminal 22 and a location between the start winding 18 and the switching device Q2. The centrifugally operated switch 24 is opened when the rotor of the motor reaches a predetermined speed such, for example, as 85% of the normal running speed.

The trigger input terminal 14 of the switching device Q1 is connected to a terminal 26, and a terminal 28 is connected through a set of normally closed contacts 30 of a thermal cutout switch to a location between the run winding 10 and the switching device Q1. The terminals 26 and 28 may be connected to any suitable switch such, for example, as a thermostat, to cause the motor to be energized when the contacts 26 and 28 are connected together and to be deenergized when they are not connected together. Should it be desired to operate the motor from a conventional line switch, then a shorting bar may be connected between the terminals 26 and 28 so that whenever the terminals L1 and L2 are energized the motor will run unless it becomes overloaded and the switch contacts 30 open.

In operation, let it be assumed that the contacts 26 and 28 are connected together by any suitable means and ac voltage is applied between the terminals L1 and L2. Voltage is thus applied between the trigger input terminal 14 and the power terminal of the switching device Q1 connected to the power line L2 wherefor the switching device Q1 is rendered conductive. Current thus flows through the run winding 10, and since the switching device Q2 is also rendered conductive because of the voltage applied between the trigger terminal 22 and the lower power terminal thereof as shown in FIG. 1, current flows through the start winding 18. When the rotor of the motor reaches a predetermined speed, the centrifugal switch 24 opens thereby removing the control voltage from the trigger input terminal 22 to interupt the flow of current between the main power terminals of the switching device Q2. The start winding 18 is thus disconnected from the circuit and the motor operates in the normal manner until such time as power is removed from the run winding 10. This may occur by removal of the voltage from between the input terminals L1 and L2 or by removal of the triggering voltage from the trigger input terminal 14 of the switching device 12. The latter condition can occur by opening of the connection between the terminals 26 and 28 or by operation of the thermal sensing device which opens the contacts 30 if the motor becomes overheated.

The Quadracs Q1 and Q2 are relatively small and may be mounted directly in or on the motor housing. Moreover, since the switch 24 does not carry the high starting current which must be carried by the conventional centrifugal switch in series with the start winding, it may be substantially smaller whereby the overall start-stop circuit can be placed within the motor housing, since the switch 24 carries a relatively low current, arcing across its contacts is minimal wherefor the use of this circuit increases the reliability and life of the motor.

Figure 2:
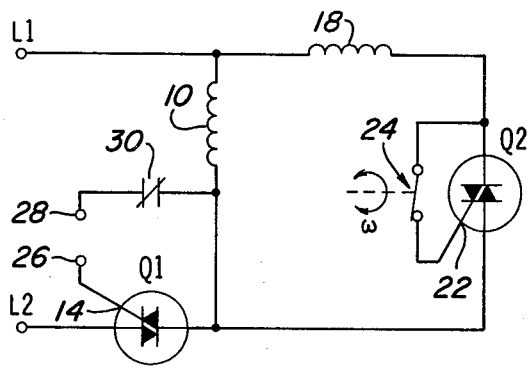
FIG. 2 is a schematic circuit diagram of a split phase ac motor control circuit embodying the present invention and employing a centrifugal switch for controlling the energization of the start winding.

Referring to FIG. 2 the present invention is shown in combination with a split phase motor and is essentially the same as the control circuit illustrated in FIG. 1. Like parts are identified by the same reference numerals as in FIG. 1 and the operation of the circuit is the same.

Figure 3:
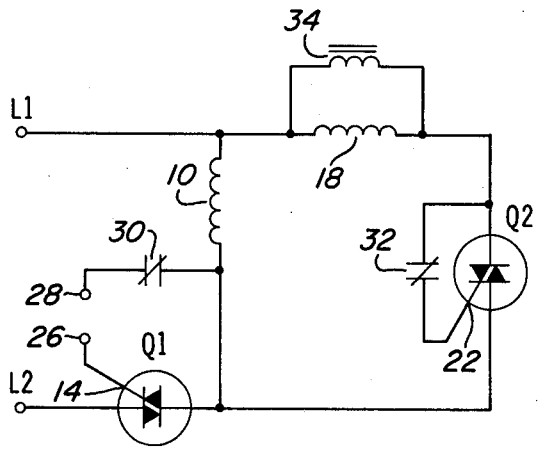
FIG. 3 is a schematic circuit diagram of a split phase ac motor control circuit embodying the present invention and employing a potential relay.

Referring to FIG. 3 the circuit of the present invention is illustrated in use with a split phase motor. The circuit is essentially the same as that illustrated in FIG. 1 except that the centrifugal switch 24 of FIG. 1 is replaced by a set of normally closed contacts 32 of a potential relay having a relay winding 34 connected in parallel with the start winding 18 of the motor. In operation, when the motor is initially energized current flows through both the run winding 10 and the start winding 18, the latter current also passing through the Quadrac Q2. As the rotor speed increases, the voltage developed across the start winding also increases until such time as it is sufficient to energize the relay winding 34 causing the relay to pick up and thereby open the contacts 32 thereof connected in the circuit to the trigger or gate terminal 22 of the Quadrac Q2. When this occurs the device Q2 becomes nonconductive between the power terminals thereof whereby the start winding 18 is disconnected from the circuit and the motor continues to run via the run winding 10.

Figure 4:
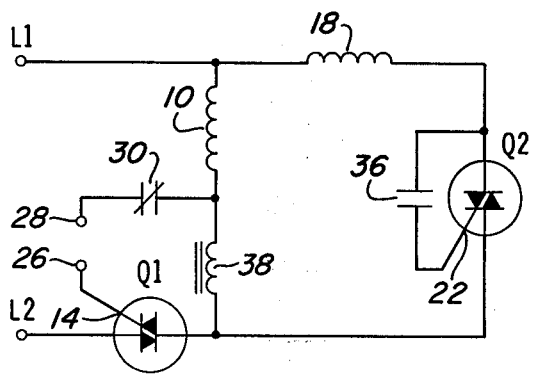
FIG. 4 is a schematic circuit diagram of a split phase ac motor control circuit embodying the present invention and employing a current relay.

Referring to FIG. 4, the circuit of the present invention is shown in use with a split phase ac motor and uses a current relay to control the application of the trigger or gating voltage to trigger input terminal 22 of the Quadrac Q2. In this embodiment of the invention a set of normally open contacts 36 of a current relay having its pick up coil 38 connected in series with the run winding 10 of the motor are connected in series in the trigger circuit of the device Q2. When the winding 10 is initially energized substantial current flows through the run winding 10 and thus through the relay coil 38 to pick up the relay and thereby close the contacts 36. When the contacts 36 close, the trigger or gating voltage is applied to the trigger input terminal of the Quadrac Q2 which becomes conductive permitting current to flow through the start winding 18. As the rotor approaches the normal operating speed the current through the run winding 10 is decreased to the level at which the relay drops out thereby opening the contacts 36 and rendering the Quadrac Q2 nonconductive. The start winding 18 is thus cut out of the circuit and the motor continues to run in the usual manner.

Figure 5:
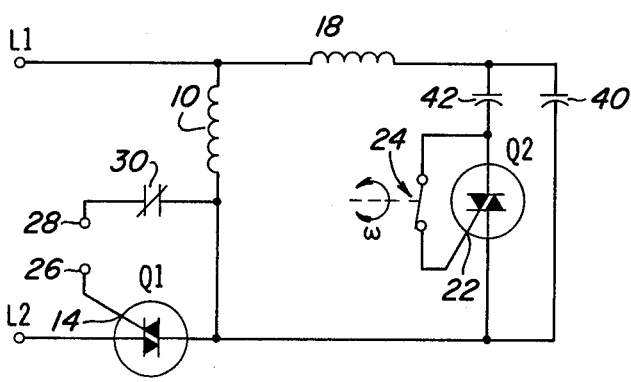
FIG. 5 is a schematic circuit diagram showing the invention employed with a capacitor start-capacitor run split phase motor.

Referring to FIG. 5, the present invention is illustrated in use with a capacitor start-capacitor run split phase ac motor. This circuit is similar to that illustrated in FIG. 1 and therefor like parts are identified by the same reference numerals. In this motor control circuit of FIG. 5 a run capacitor 40 is connected in series with the start winding 18 across the power input terminals through the power terminals of the switching device Q1. A start capacitor 42 is connected in series with the power terminals of the Quadrac Q2 across the run capacitor 40. In this motor control circuit, when the rotor approaches normal running speed and the centrifugal switch 24 opens, the capacitor 42 is cut out of the circuit but the start winding 18 and the run capacitor 40 remain in circuit and the motor runs in the normal manner.

Figure 6:
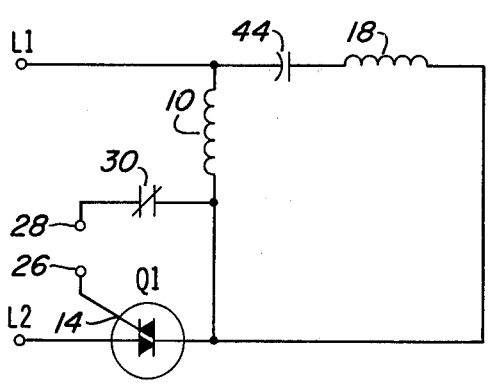
FIG. 6 is a schematic circuit diagram showing one aspect of the present invention employed with a permanent split capacitor (PSC) motor.

Referring to FIG. 6 there is shown a control circuit for a permanent split capacitor (PSC) motor embodying the present invention. With this type of motor the run and start windings are in circuit at all times while the motor is running, and a run capacitor 44 is connected in series with the start winding 18. As described hereinabove in connection with FIG. 1, the low current trigger circuit for the Quadrac Q1 is used to control the energization and deenergization of the motor.

It may thus be seen that the present invention enables the use of low current control circuits for starting and stopping ac split phase motors. Accordingly, minimal arcing of the switching contacts occurs thereby increasing the reliability and life of the associated motor.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A solid state start-stop circuit for a split phase alternating current motor having a run winding and a start winding, comprising in combination a solid state bilateral switching device having a trigger input terminal and a pair of power terminals, said power terminals being connected in series with said start winding for connection across a source of variable a.c. voltage, normally closed switch means connected between said trigger input terminal and the connection between said start winding and said source of a.c. voltage, and means responsive to the speed of said motor and independent of the voltage level of said source of a.c. voltage for operating said switch means when the speed of said motor exceeds a fixed predetermined value to disconnect said trigger input terminal from said source of a.c. voltage, whereby said start winding is disconnected from said source of a.c. voltage when said motor reaches said predetermined speed.

2. A solid state start-stop circuit according to claim 1 wherein said switch means is a centrifugally operated switch.

3. A solid state start-stop switching circuit according to claim 1 wherein said solid state bilateral switching device is a Quadrac.

* * * * *